(12) United States Patent
Gopalakrishnan et al.

(10) Patent No.: US 11,829,307 B2
(45) Date of Patent: *Nov. 28, 2023

(54) DRAM INTERFACE MODE WITH INTERRUPTIBLE INTERNAL TRANSFER OPERATION

(71) Applicant: Rambus Inc., San Jose, CA (US)

(72) Inventors: Liji Gopalakrishnan, Sunnyvale, CA (US); Frederick A. Ware, Los Altos Hills, CA (US); Brent S. Haukness, Sunnyvale, CA (US)

(73) Assignee: Rambus Inc., San Jose, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/568,645

(22) Filed: Jan. 4, 2022

(65) Prior Publication Data

US 2022/0261361 A1 Aug. 18, 2022

Related U.S. Application Data

(63) Continuation of application No. 16/546,176, filed on Aug. 20, 2019, now Pat. No. 11,226,909.

(Continued)

(51) Int. Cl.
*G06F 3/00* (2006.01)
*G06F 13/16* (2006.01)
*G06F 3/06* (2006.01)

(52) U.S. Cl.
CPC ........ *G06F 13/1668* (2013.01); *G06F 3/0604* (2013.01); *G06F 3/0647* (2013.01); *G06F 3/0659* (2013.01); *G06F 3/0673* (2013.01)

(58) Field of Classification Search
None
See application file for complete search history.

(56) References Cited

U.S. PATENT DOCUMENTS 4,949,244 A 8/1990 Kubo et al.
5,655,099 A 8/1997 Bjerge et al.
(Continued)

OTHER PUBLICATIONS

Wikipedia.com, Dynamic random access memory, Jun. 29, 2017, pp. 1-16 (Year: 2017).*

(Continued)

*Primary Examiner* — Henry Tsai
*Assistant Examiner* — Dean Phan
(74) *Attorney, Agent, or Firm* — Lance Kreisman; Peninsula Patent Group

(57) ABSTRACT

Memory controllers, devices, modules, systems and associated methods are disclosed. In one embodiment, an integrated circuit (IC) memory device is disclosed. The memory device includes an array of storage cells and command interface circuitry to receive an internal transfer command. In response to the internal transfer command, transfer logic reads data from a first portion of the array of storage cells, transfers the data as on-chip transfer data, and writes the on-chip transfer data to a second portion of the array of storage cells. In response to the command interface circuitry receiving an interrupt command, the transfer logic pauses the internal transfer operation, and carries out an unrelated memory access operation involving at least the first portion of the array of storage cells or the second portion of the array of storage cells.

20 Claims, 7 Drawing Sheets

Related U.S. Application Data

(60) Provisional application No. 62/722,489, filed on Aug. 24, 2018.

(56) References Cited

U.S. PATENT DOCUMENTS

| | | | |
|---|---|---|---|
| 5,694,538 | A | 12/1997 | Okazaki et al. |
| 5,873,122 | A | 2/1999 | Nishii et al. |
| 5,963,481 | A | 10/1999 | Alwais et al. |
| 6,151,256 | A | 11/2000 | Maesako et al. |
| 6,282,505 | B1 | 8/2001 | Hanawa et al. |
| 6,377,501 | B2 | 4/2002 | Maesako et al. |
| 6,452,864 | B1 | 9/2002 | Condemi et al. |
| 6,587,913 | B2 | 7/2003 | Campanale et al. |
| 6,791,877 | B2 | 9/2004 | Miura et al. |
| 6,792,499 | B1 | 9/2004 | Eldredge |
| 7,003,713 | B2 | 2/2006 | Rodgers |
| 7,271,618 | B2 | 9/2007 | Hsu |
| 7,281,079 | B2 | 10/2007 | Bains et al. |
| 7,461,216 | B2 | 12/2008 | Sved et al. |
| 7,516,264 | B2 | 4/2009 | Brittain et al. |
| 8,122,186 | B2 | 2/2012 | Lim et al. |
| 8,185,690 | B2 | 5/2012 | Miura et al. |
| 8,595,459 | B2 | 11/2013 | Ware et al. |
| 8,788,741 | B2* | 7/2014 | Kwon ................. G06F 11/004 711/E12.103 |
| 8,898,425 | B1 | 11/2014 | Pollack et al. |
| 8,908,466 | B2 | 12/2014 | Ware et al. |
| 8,918,575 | B2 | 12/2014 | Markey et al. |
| 9,064,562 | B2 | 6/2015 | Venugopal et al. |
| 9,076,526 | B2 | 7/2015 | Chung |
| 9,183,082 | B2 | 11/2015 | Kim et al. |
| 2004/0107337 | A1 | 6/2004 | Sugure et al. |
| 2006/0041702 | A1 | 2/2006 | Greenberger |
| 2006/0156189 | A1* | 7/2006 | Tomlin ................ G06F 12/0246 714/763 |
| 2006/0248381 | A1* | 11/2006 | Fujita ................. G06F 11/2069 714/6.22 |
| 2015/0178187 | A1 | 6/2015 | Sheffler et al. |
| 2016/0028395 | A1* | 1/2016 | Bains ............... H03K 19/01825 326/30 |

OTHER PUBLICATIONS

"Open NAND Flash Interface Specification" ONFI www.onfi.org. 315 pages.

Anxiao (Andrew) Jiang† et al., "Joint Rewriting and Error Correction in Write-Once Memories", 2013 IEEE International Symposium on Information Theory. 5 pages.

Kazutami Arimoto et al. "Dynamic Rams", ISSCC 89 Friday, Feb. 17, 1989 East Grand Ballroom 110:45 A.M., 3 pages.

Kevin K. Chang et al. "Low-Cost Inter-Linked Subarrays (LISA): Enabling Fast Inter-Subarray Data Movement in DRAM", High Performance Computer Architecture (HPCA) 2016 IEEE International Symposium on, pp. 568-580, 2016, ISSN 2378-203X. 13 pages.

Vivek Seshadri et al., "RowClone: Fast and energy-efficient in-DRAM bulk data copy and initialization", Microarchitecture (MICRO) 2013 46th Annual IEEE/ACM International Symposium on, pp. 185-197, 2013. 13 p.

Wikipedia.com, Dynamic Random-Access Memory, Jun. 29, 2017, pp. 1-16 (Year: 2017). 16 pages.

* cited by examiner

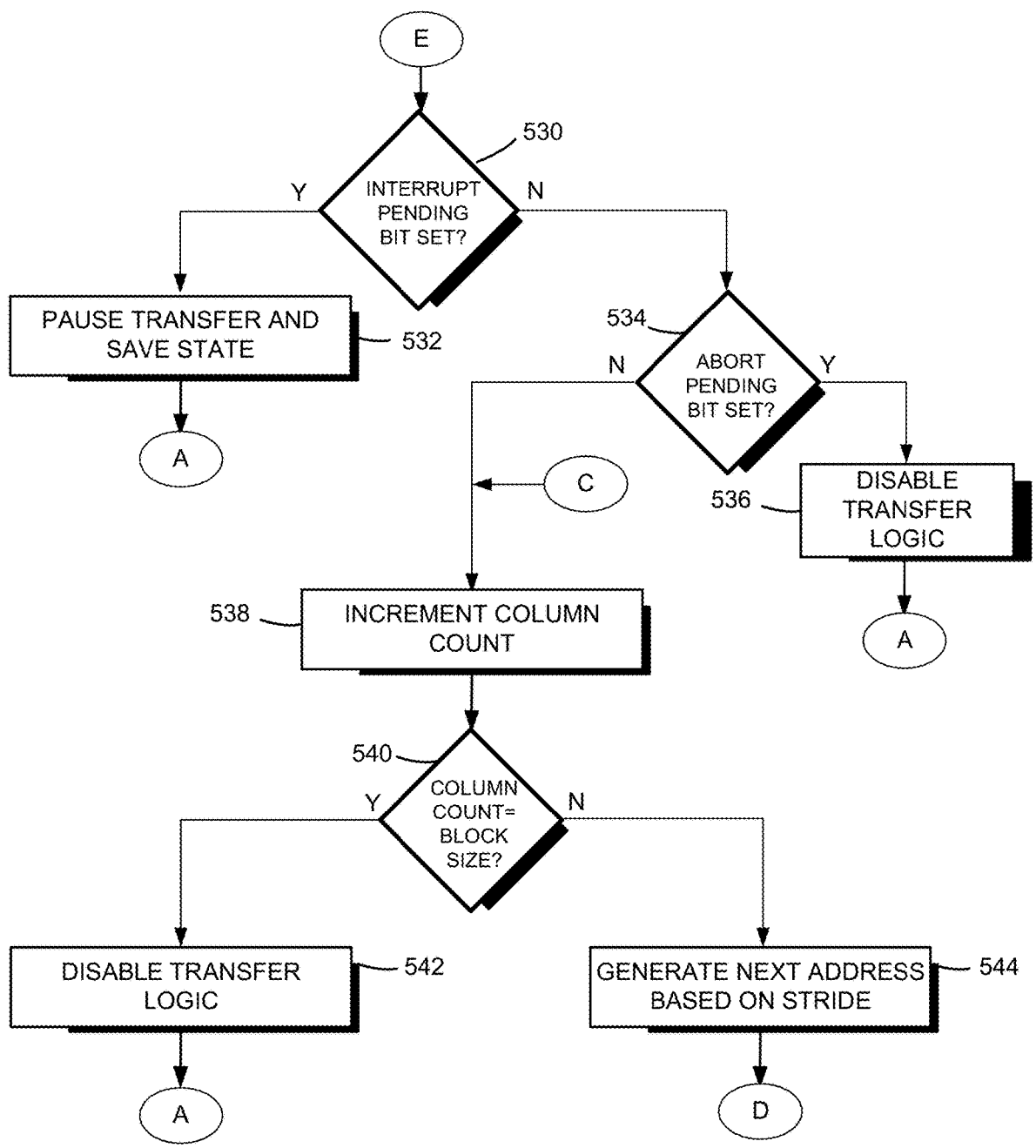

DRAM INTERFACE MODE WITH INTERRUPTIBLE INTERNAL TRANSFER OPERATION

CROSS-REFERENCE TO RELATED APPLICATIONS

This application is a Continuation of U.S. patent application Ser. No. 16/546,176, filed Aug. 20, 2019, entitled DRAM INTERFACE MODE WITH INTERRUPTIBLE INTERNAL TRANSFER OPERATION, which is a Non-Provisional that claims priority to U.S. Provisional Application No. 62/722,489, filed Aug. 24, 2018, entitled DRAM INTERFACE MODE WITH INTERRUPTIBLE INTERNAL TRANSFER OPERATION, all of which are incorporated herein by reference in their entirety.

TECHNICAL FIELD

The disclosure herein relates to memory modules, memory controllers, memory devices, and associated methods.

BACKGROUND

Main memory systems often employ block data copy operations as a useful way to manipulate data. Applications that benefit from block data copying include process checkpointing, virtual machine cloning, CPU-GPU communications, and so forth.

BRIEF DESCRIPTION OF THE DRAWINGS

Embodiments of the disclosure are illustrated by way of example, and not by way of limitation, in the figures of the accompanying drawings and in which like reference numerals refer to similar elements and in which:

FIG. 5C illustrates further steps relating to the internal transfer operations of FIG. 5A.

DETAILED DESCRIPTION

Memory modules, memory controllers, devices and associated methods are disclosed. In one embodiment, an integrated circuit (IC) memory device is disclosed that includes command interface circuitry to receive an internal transfer command. Transfer logic, responsive to the internal transfer command, accesses stored data from a first portion of the array of storage cells, and writes the data to a second portion of the array of storage cells. The transfer logic, in response to the command interface circuitry receiving an interrupt command, pauses the internal transfer operation, and carries out an unrelated memory access operation involving the storage cells. By employing an internal transfer capability for carrying out block data copy operations, interface power consumed by the memory device may be reduced while effectively increasing channel bandwidth. Other embodiments utilize a memory command protocol that not only provides an interruptible internal transfer operation capability, but also enables aborting in-process transfer operations.

Figure 1:
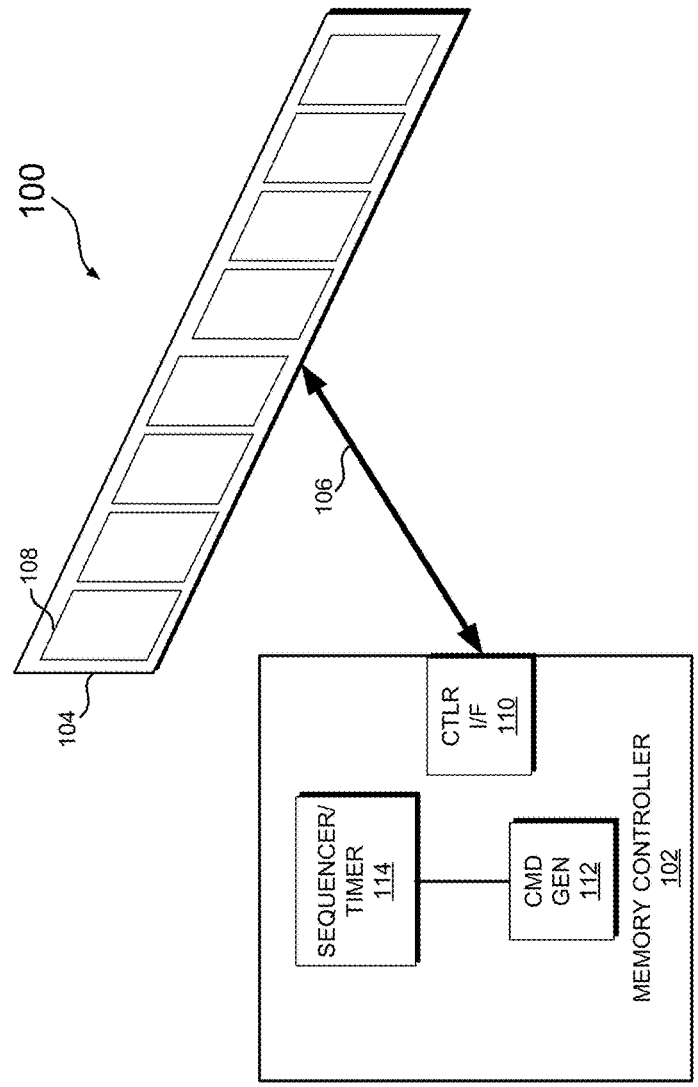
FIG. 1 illustrates one embodiment of a memory system that employs a memory controller, and a memory module.

With reference to FIG. 1, a memory system, generally designated 100, is shown that includes a memory controller 102 coupled to a memory module 104 via bus 106. The memory module includes at least one memory device 108. For one embodiment, the memory controller 102 is a dynamic random access memory (DRAM) controller, with the memory device 108 realized as a DRAM memory device. In some embodiments, the memory controller and memory device may be embodied as integrated circuits, or chips. Other embodiments may employ the memory controller as a circuit in a general purpose processor. Specific embodiments for the DRAM memory controller 102 and memory device 108 may be compliant with various DRAM standards, including double data rate (DDR) variants, low power (LPDDR) versions, and graphics (GDDR) types. Other embodiments may include multi-chip modules that, for example, employ stacked memory die, or stacked packages. Such embodiments may be used with the memory module 106. Additional embodiments may stack memory die and logic die together in a common package, or in separate packages stacked upon each other.

Further referring to FIG. 1, the memory controller 102 includes a controller interface 110 for transferring data, command and control signals between the memory controller 102 and the memory device 108. Command generation circuitry 112 generates command, control, address and mode register write (MRW) commands for transmission to the memory device 108. For one embodiment, explained below, the command generation circuitry 112 generates MRW commands for storing values associated with internal transfer control settings into a mode register on the memory device 108. A sequencer/timer 114 monitors the sequencing of various internal transfer operations and tracks the time associated with the various operations to maintain a high level of determinism.

Figure 2:
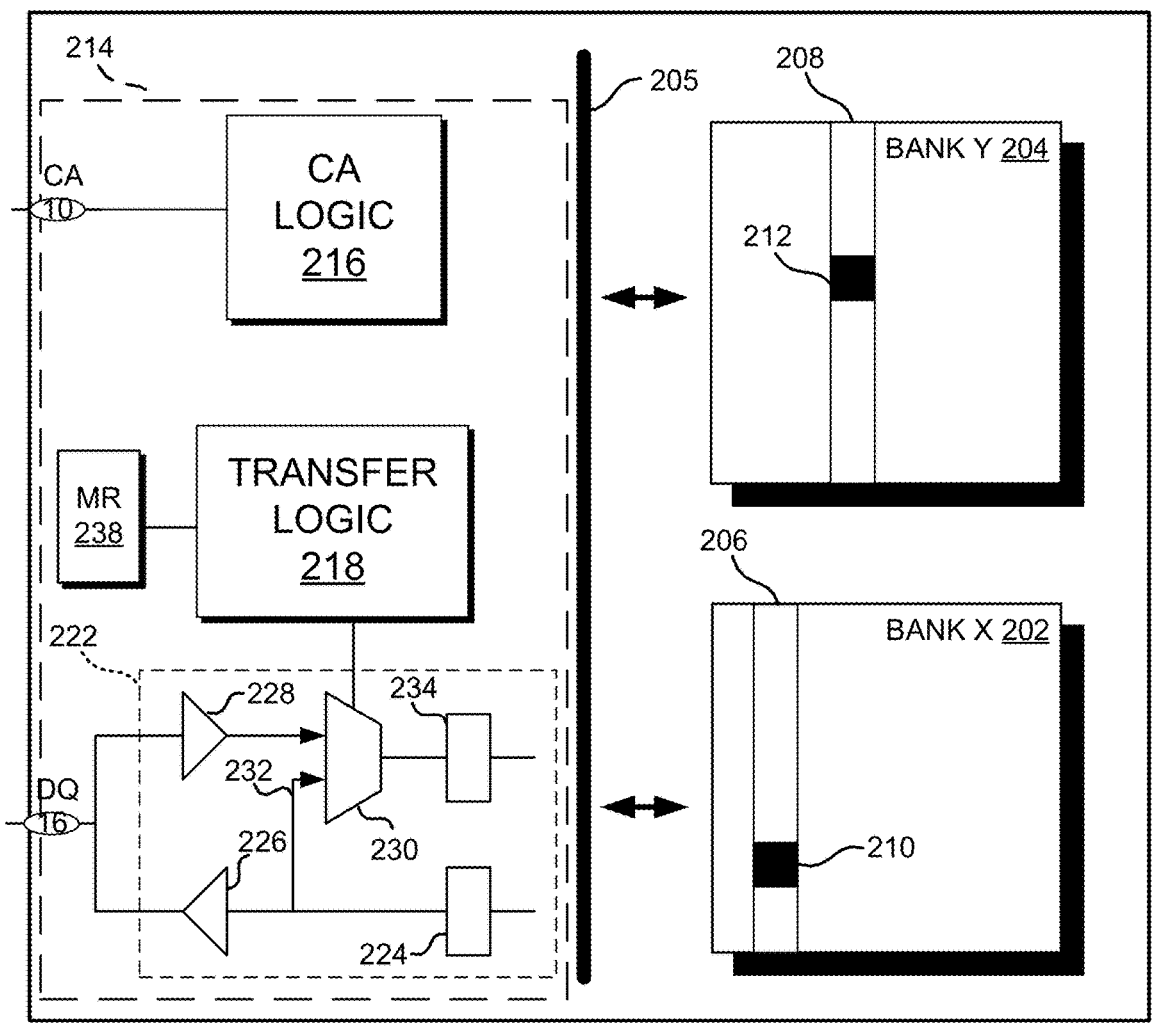
FIG. 2 illustrates one embodiment of a memory device for use on the memory module shown in FIG. 1.

FIG. 2 illustrates one specific embodiment of a memory device, generally designated 200, corresponding to the memory devices 108 shown in FIG. 1. The memory device 200 includes an array of storage cells organized into independently addressable banks 202 and 204. Each bank includes addressable rows 206, 208 and columns 210, 212. The identified columns are shaded to represent column data for transfer between banks as more fully described below. The respective banks 202 and 204 couple to a global data bus 205.

Further referring to FIG. 2, the memory device 200 includes interface circuitry 214 in the form of command, control and address (CA) logic 216, transfer logic 218, and data interface logic 222. The CA logic 216 interfaces with the memory controller interface 110 via a command, control and address (CA) bus 220. The CA logic 216 generally receives command, control and address signals from the memory controller 102 relating to memory access operations. The transfer logic 218 generally controls internal transfer operations within the memory device 200 as explained more fully below.

With continued reference to FIG. 2, for one embodiment, the data interface logic 222 includes a read data path including a read data latch 224 that feeds a 256-to-16 serializer and input/output I/O circuit 226. For standard read operations, read data retrieved and sent over the read data path is provided to the I/O circuit for serialization and transmission along output data link DQ. The data interface logic also includes a write data path that includes an I/O circuit and deserializer 228 that feeds a selector or multiplexer 230.

Further referring to FIG. 2, the multiplexer 230 includes a second input, at 232, that receives read data from the read data path. For standard write operations, write data received from the controller by the I/O 228 is passed through the multiplexer 230 to a write data latch 234. When the memory device is configured in an internal transfer mode, the multiplexer passes the read data to the write latch such that the I/O circuit 226 is bypassed. As a result, read data retrieved during an internal transfer is written as write data while remaining entirely on-chip, without being transferred to the memory controller 102. The multiplexer 230 includes a control input that receives configuration control signals provided by the transfer logic 218.

Configuring the memory device of FIG. 2 in a mode capable of performing internal transfer operations may be carried out in a variety of ways. For one embodiment, mode register circuitry 238 may be employed, and may utilize legacy memory device register fields with extensions that are programmable to accomplish certain control and parameter settings. In such an embodiment, the memory controller 102 issues MRW commands to load the mode register with appropriate settings relating to, for example, transfer data size, source and destination addresses, stride, and so forth. Such an embodiment is further described below with respect to FIG. 3. In another embodiment, existing legacy device commands may be repurposed for different modes of operation involving one or more internal transfer transactions. Other embodiments may employ a custom command protocol to set various parameters in the memory device for the internal transfer operation.

Figure 3:
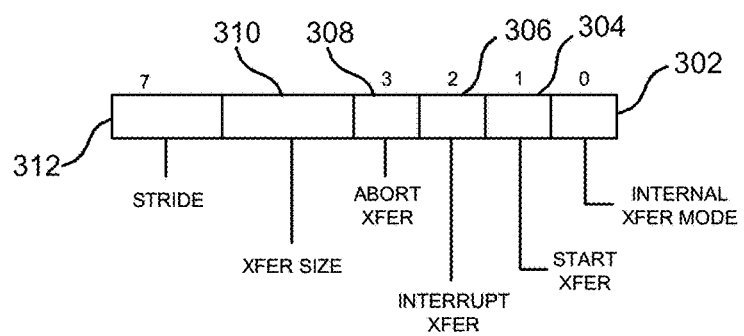
FIG. 3 illustrates one embodiment of control bit fields for use in the mode register storage of the memory device of FIG. 2.

Referring to FIG. 3, for one embodiment, the mode register storage 238 of FIG. 2 includes storage in the form of registers, buffers or the like to store various setting values for optimally carrying out internal transfer transactions. The values may be read out as status values in response to mode register read (MRR) commands sent by the memory controller to support direct commands from the controller that initiate the start, interrupt, and end of internal transfers. For instance, a first storage location or field, at 302 stores a bit value indicating whether an internal transfer mode is enabled. At 304, a second field stores a bit value indicating whether an internal transfer has started. A third field, at 306, stores a bit value indicating whether a given internal transfer has been interrupted. At 308, an abort transfer field is provided to indicate whether an abort command has been received. A value representing a transfer size for a given internal transfer operation may be stored in a field, at 310. A stride value may be stored in a field, at 312, representing an address offset for a subsequent iteration of a given internal transfer operation.

For another embodiment, internal transfer operations may be controlled by the memory controller through mode register write (MRW) operations. For example, and referring to the fields of FIG. 3, initiating an internal transfer may be effected by performing an MRW to write an enable bit to field 304. An interrupt to the transfer could then be carried out by performing an MRW to write an enable bit to field 306. Aborting the internal transfer could be carried out similarly, by writing an enable bit to field 308 via another MRW.

Figure 4:
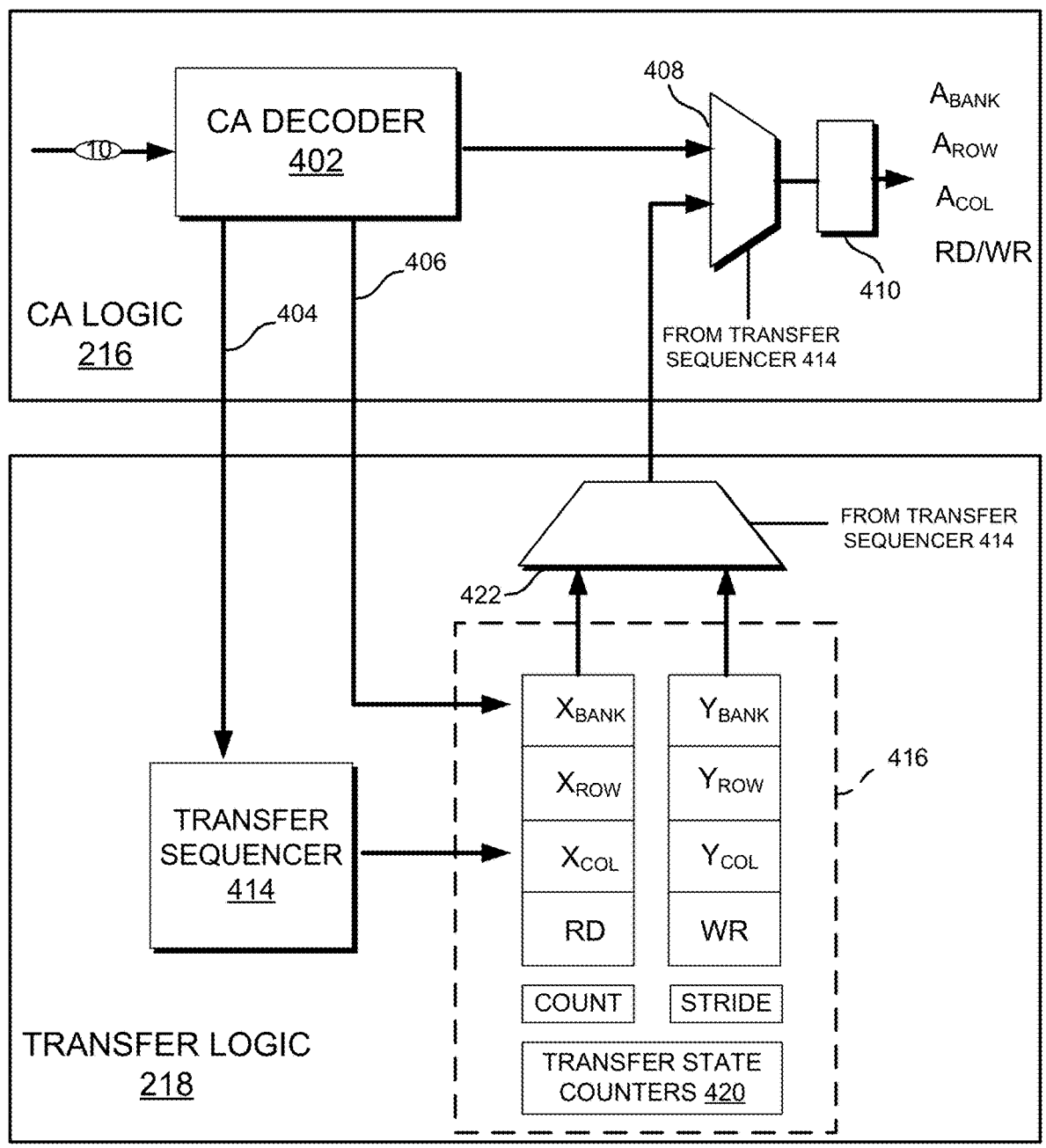
FIG. 4 illustrates further detail of one embodiment of the memory device of FIG. 2.

FIG. 4 illustrates further detail for one embodiment of the CA logic 216 and the transfer logic 218 of FIG. 2. The CA logic 216 includes a CA decoder 402 that decodes various commands and control signals received from the memory controller 102. For one embodiment, the CA decoder 402 decodes and routes internal transfer-specific command signals such as "Load", "Start", and "Interrupt" to the transfer logic 218 along path 404. The controller sequencer/timer 114 monitors dispatch and time duration of the commands in a deterministic manner, so that subsequent command and control signals can be scheduled and dispatched at appropriate times to maximize the command/control bus efficiency and throughput. Control signals relating to an internal transfer operation, such as "Start address", "Destination address", Transfer size or count, and stride may also be passed to the transfer logic 218 along path 406. The output of the CA decoder 402 feeds one input of an address multiplexer 408. A second input of the multiplexer receives a selected internal transfer address from the transfer logic 218, more fully discussed below. The address multiplexer 408 includes an output that feeds an output register or latch 410 with the address information for a particular internal transfer access. In a normal mode of operation, the address multiplexer passes an address from the memory controller 102 to its output. For an internal transfer mode, addresses are selectively provided by the transfer logic 218.

Further referring to FIG. 4, the transfer logic 218 includes a transfer sequencer 414 that receives the internal transfer command signals from the CA decoder 402. The transfer sequencer 414 generates sequencing control signals such as "Load", "Increment", and "Unload" to control operation of state register circuitry 416 that stores a current state of internal transfer sequencing for a given internal transfer operation. The state register circuitry 416 includes storage fields for storing states relating to addresses involved in the read and write operations pertaining to a given internal transfer operation. For one embodiment, addresses involved in a read operation involve a set of bank address ($X_{BANK}$), row address ($X_{ROW}$), and column address ($X_{COL}$) values. Similar address fields are provided for an internal write operation, with a corresponding set of bank address ($Y_{BANK}$), row address ($Y_{ROW}$), and column address ($Y_{COL}$) values. In one embodiment, separate read and write status registers RD and WR are provided to indicate whether the particular bank is reading or writing data for the internal transfer operation. For other embodiments where commands are effected through MRW operations, the "write status" for the write status register WR would effectively be writing the register to carry out the command. A count register COUNT tracks the amount of data having been transferred versus the total amount of data that needs to be transferred. A stride counter STRIDE stores the programmed address offset value, or stride, for sequencing subsequent addresses. Transfer state counters, at 420, are also provided. A state multiplexer 422 selectively passes either the read address information or the write address information to one input of the address multiplexer 408, depending on whether the given internal transfer sub-operation is a read or write transaction.

As noted above, operation of the memory system described above is generally managed by the memory controller 102 by scheduling and monitoring internal transfer operations while giving high-priority transactions access to the same banks of memory as-needed through interrupts. A given internal transaction of block data often involves a transfer of data from an entire bank of storage cells to another bank of storage cells. Such a transfer may thus involve an iterative sequence of smaller transfers, such as at a column level of granularity or larger. Carrying out block data copy operations with internal transfer operations in this manner minimizes interface power while maximizing channel bandwidth.

Figure 5A:
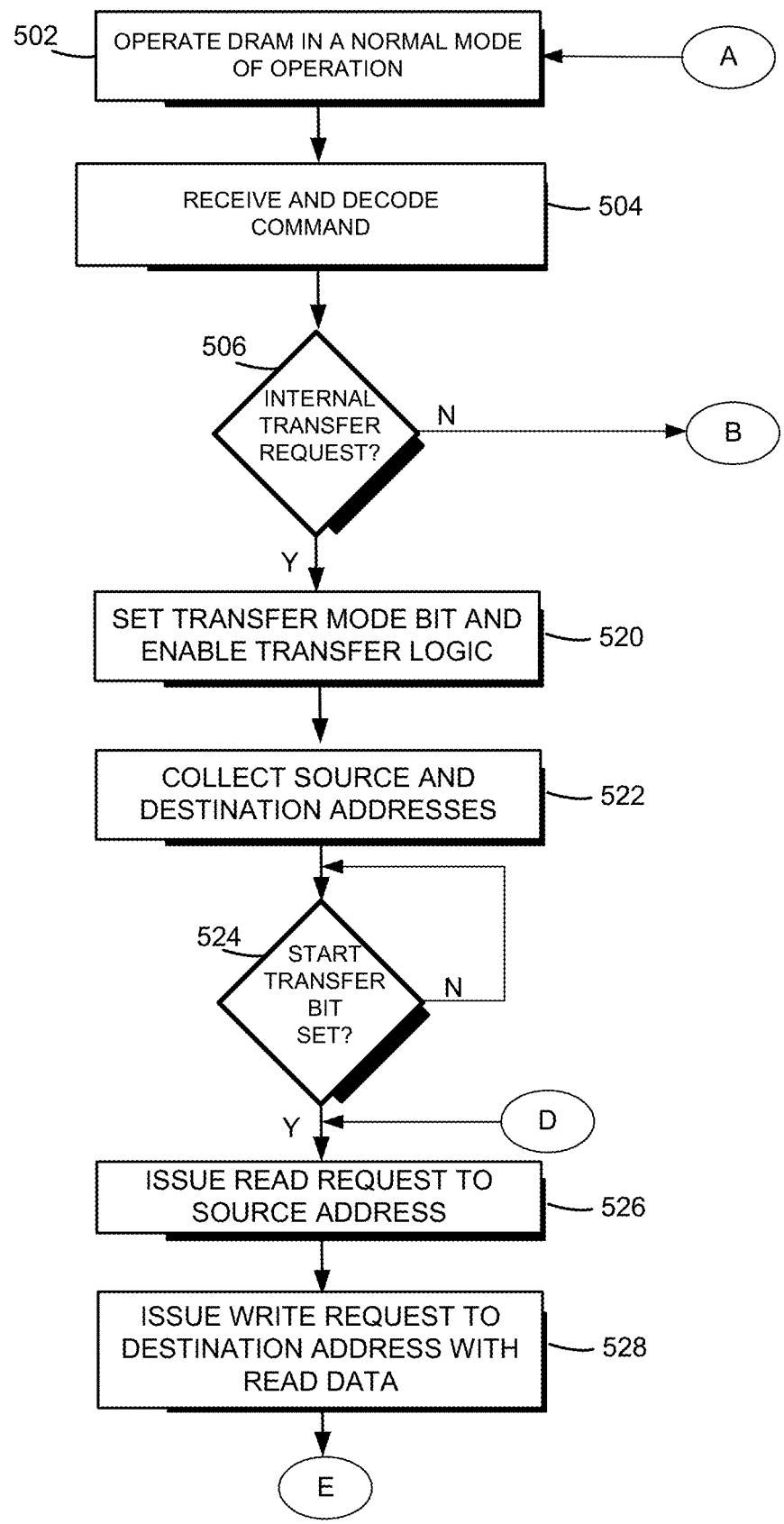
FIG. 5A illustrates one embodiment of a flow chart of steps involving internal transfer operations during operation of the memory device of FIG. 2.
Figure 5B:
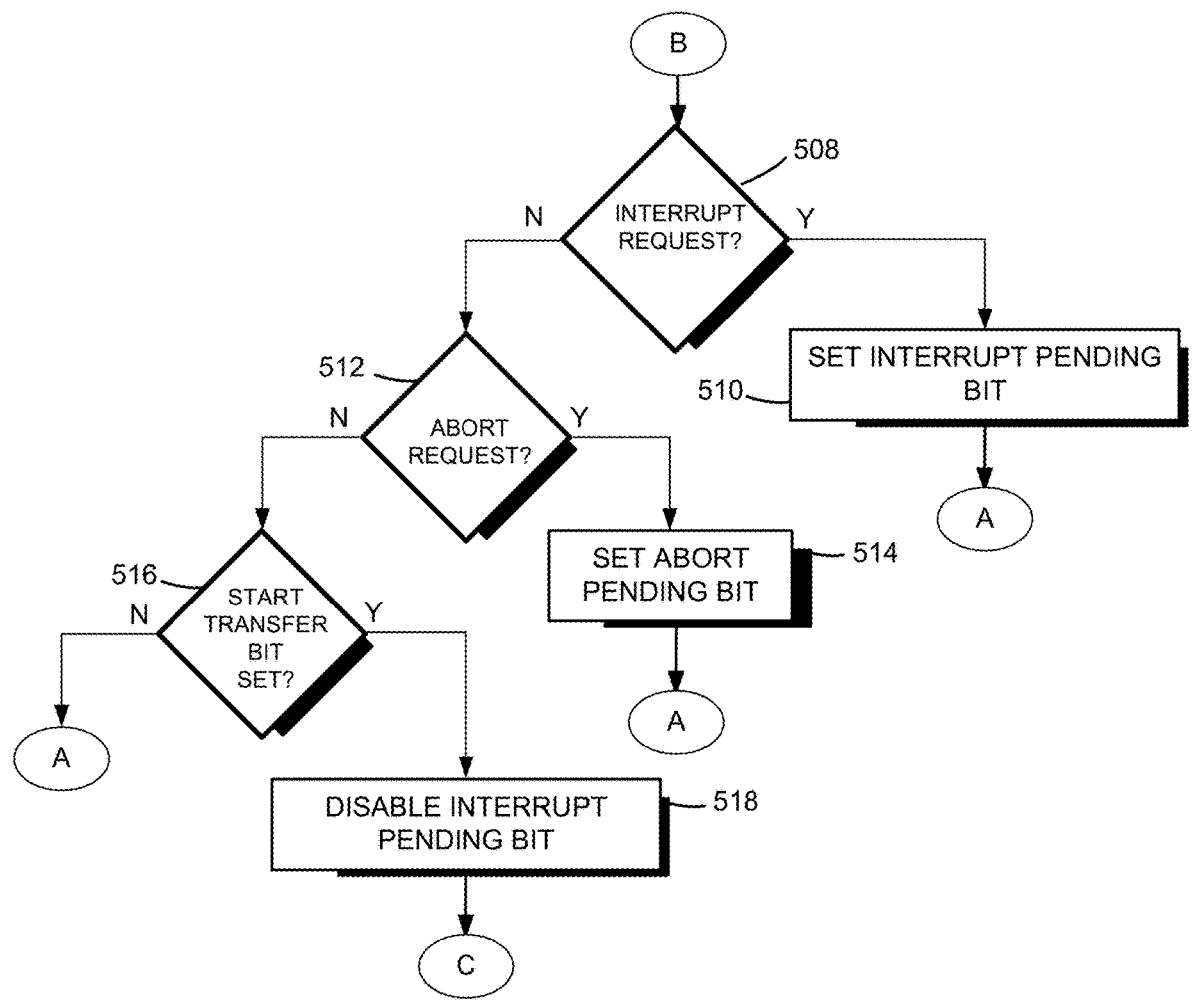
FIG. 5B illustrates further steps relating to the internal transfer operations of FIG. 5A.

Referring now to FIG. 5A, one embodiment of operating a given DRAM memory device consistent with the structure described above for non-block data copy operations is described from the viewpoint of a single DRAM memory device. For non-block data copy operations, the memory device operates in a normal random access mode of operation, at 502. Each command received by the memory device is decoded, at 504, and evaluated as to whether the command is internal transfer request, at 506. For the normal operating mode, where the command is not an internal transfer request, the flow of steps follows directional "B" to FIG. 5B in a sequence of determinations that either confirm operation in the normal mode, or carry out control bit setting relating to a transfer request. A first evaluation in FIG. 5B starts with whether the command is an interrupt request, at 508. If so, then an interrupt bit in the mode register is set to an enable value, at 510, with operation returning to step 502 along directional A. If the command is not an interrupt request, then a determination is made, at 512, as to whether the command is an abort request. If so, than an abort bit in the mode register is set, at 514, with operation returning to step 502 along directional A. If the command is not an abort request, then a further evaluation is made, at 516, as to whether the command is a start transfer command. If it is, then the interrupt pending bit is disabled, at 518, with operation continuing with step 538, to increment a column count, in FIG. 5C. If the command is not a start transfer command, then operation proceeds to step 502 (FIG. 5A) along directional A.

If, at step 506 (FIG. 5A), the evaluated command was an internal transfer request, then a transfer mode bit in the mode register is set to enable the transfer logic in the memory device, at 520, including enabling the bypass path 232 to route data between the read and write paths in a manner that bypasses the data I/O circuit. Source and destination addresses are then collected, at step 522. If the start transfer bit is set, at 524, then a read request is issued to the first source address, at 526. The read request involves a row activation corresponding to the values loaded into address fields $X_{BANK}$ and $X_{ROW}$, followed by a column read of the data corresponding to the address loaded into the address field $X_{COL}$. A write request is then issued, at 528, to a first destination address along with the accessed read data associated with the read request. The write operation involves a row activation corresponding to the address values loaded into address fields $Y_{BANK}$ and $Y_{ROW}$, followed by a column write of the data to the address loaded into the address field $Y_{COL}$. Operation then proceeds to the steps of FIG. 5C along directional E.

Referring now to FIG. 5C, following the read and write steps above, a determination is made as to whether the interrupt pending bit is set, at 530. If it is, then the transfer is paused, the state of the data transfer saved to the state registers, and a higher-priority operation involving one or more of the banks may take place with operation returning to step 502. If the interrupt pending bit is not set, then a further determination is made as to whether the abort pending bit is set, at 534. If it is, then the transfer is halted by disabling the transfer logic, and returning the state registers to a default state. Where the abort pending bit is not set, then operation proceeds by incrementing a column count value, at 538. The column count tracks the progress of the transfer so that the entire transfer ends when the column count matches the mode register transfer size value. Once the column count is incremented (or decremented if the value is initially set at the transfer size value), then an evaluation as to whether the column count matches the block size (or transfer size) is carried out, at 540. If there's a match, then the internal transfer is complete, and the transfer logic is disabled, at 542, and operation returns to step 502. If the count does not match the block size, then a next address is generated based on the mode register stride value, at 544, with operation proceeding to step 526 along directional D.

Figure 6:
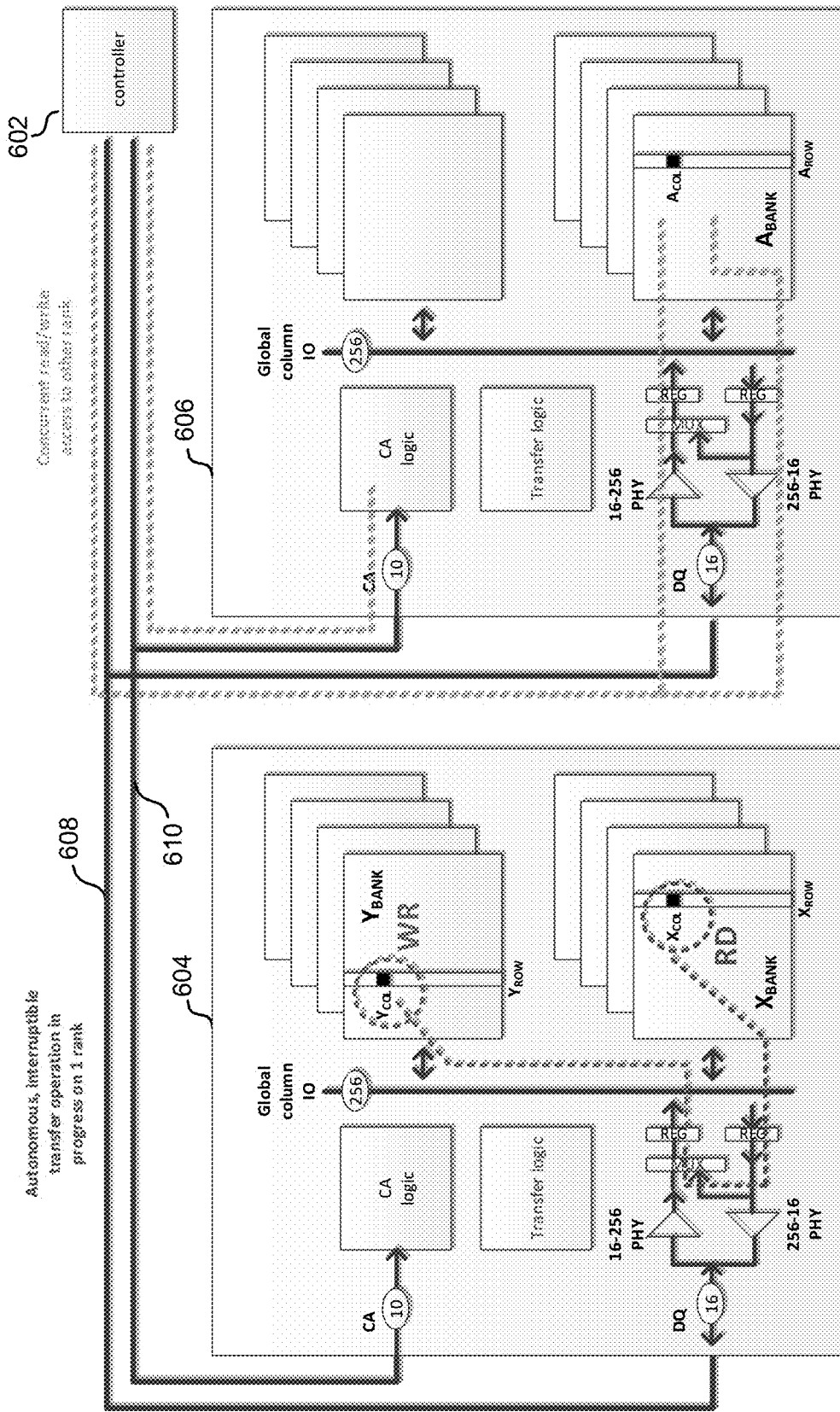
FIG. 6 shows one embodiment of the interrelationship between multiple ranks during operation of the memory module of FIG. 1.

In one embodiment, the memory system of FIG. 1 includes memory devices organized into multiple ranks. Generally, a memory rank is a set of DRAM chips responsive to the same chip select signal. Multiple ranks of DRAMs share the same data bus paths and are selected using dedicated chip select signals. FIG. 6 illustrates a multi-rank situation where a memory controller 602 interfaces with a first DRAM rank 604 and a second DRAM rank 606 along respective data bus and CA bus paths 608 and 610. Each of the first and second ranks includes circuitry similar to the DRAM device described herein, and shown in FIGS. 1-4. For one embodiment, the memory controller 602 schedules internal transfers between banks in the first rank 604, while concurrently performing random access read/write operations in the second rank 606. The CA logic 216 for a given first DRAM component of the first DRAM rank 604 monitors and effectively ignores commands directed to a second DRAM component of the second DRAM rank 606. Carrying out such multi-rank operations in parallel, or concurrently, effectively provides a 2× increase in channel bandwidth over architectures that perform sequenced serial rank operations.

Those skilled in the art will appreciate that the architecture described above enables block data copy operations with a given rank to be carried out in a manner that minimizes interface power while maximizing channel bandwidth. High-priority operations may still be carried out through an interrupt process that temporarily pauses the internal transfer.

When received within a computer system via one or more computer-readable media, such data and/or instruction-based expressions of the above described circuits may be processed by a processing entity (e.g., one or more processors) within the computer system in conjunction with execution of one or more other computer programs including, without limitation, net-list generation programs, place and route programs and the like, to generate a representation or image of a physical manifestation of such circuits. Such representation or image may thereafter be used in device fabrication, for example, by enabling generation of one or more masks that are used to form various components of the circuits in a device fabrication process.

In the foregoing description and in the accompanying drawings, specific terminology and drawing symbols have been set forth to provide a thorough understanding of the present invention. In some instances, the terminology and symbols may imply specific details that are not required to practice the invention. For example, any of the specific numbers of bits, signal path widths, signaling or operating frequencies, component circuits or devices and the like may be different from those described above in alternative embodiments. Also, the interconnection between circuit elements or circuit blocks shown or described as multi-conductor signal links may alternatively be single-conductor signal links, and single conductor signal links may alternatively be multi-conductor signal links. Signals and signaling paths shown or described as being single-ended may also be differential, and vice-versa. Similarly, signals described or depicted as having active-high or active-low logic levels may have opposite logic levels in alternative embodiments. Component circuitry within integrated circuit devices may be implemented using metal oxide semiconductor (MOS) technology, bipolar technology or any other technology in which logical and analog circuits may be implemented. With respect to terminology, a signal is said to be "asserted" when the signal is driven to a low or high logic state (or charged to a high logic state or discharged to a low logic state) to indicate a particular condition. Conversely, a signal is said to be "deasserted" to indicate that the signal is driven (or charged or discharged) to a state other than the asserted state (including a high or low logic state, or the floating state that may occur when the signal driving circuit is transitioned to a high impedance condition, such as an open drain or open collector condition). A signal driving circuit is said to "output" a signal to a signal receiving circuit when the signal driving circuit asserts (or deasserts, if explicitly stated or indicated by context) the signal on a signal line coupled between the signal driving and signal receiving circuits. A signal line is said to be "activated" when a signal is asserted on the signal line, and "deactivated" when the signal is deasserted. Additionally, the prefix symbol "/" attached to signal names indicates that the signal is an active low signal (i.e., the asserted state is a logic low state). A line over a signal name (e.g., '<signalname>') is also used to indicate an active low signal. The term "coupled" is used herein to express a direct connection as well as a connection through one or more intervening circuits or structures. Integrated circuit device "programming" may include, for example and without limitation, loading a control value into a register or other storage circuit within the device in response to a host instruction and thus controlling an operational aspect of the device, establishing a device configuration or controlling an operational aspect of the device through a one-time programming operation (e.g., blowing fuses within a configuration circuit during device production), and/or connecting one or more selected pins or other contact structures of the device to reference voltage lines (also referred to as strapping) to establish a particular device configuration or operation aspect of the device. The term "exemplary" is used to express an example, not a preference or requirement.

While the invention has been described with reference to specific embodiments thereof, it will be evident that various modifications and changes may be made thereto without departing from the broader spirit and scope of the invention. For example, features or aspects of any of the embodiments may be applied, at least where practicable, in combination with any other of the embodiments or in place of counterpart features or aspects thereof. Accordingly, the specification and drawings are to be regarded in an illustrative rather than a restrictive sense.

We claim:

1. A memory module, comprising:
 a substrate;
 multiple integrated circuit (IC) memory chips disposed on the substrate, ones of the multiple IC memory chips including
  an array of storage cells;
  transfer circuitry responsive to a transfer command, to perform an on-chip transfer of data from a first portion of the array of storage cells to a second portion of the array of storage cells; and
  wherein the transfer circuitry, in response to an interrupt command, is to pause the on-chip transfer of data involving the first portion of the array of storage cells and the second portion of the array of storage cells, and to carry out an unrelated memory access operation involving at least the first portion of the array of storage cells or the second portion of the array of storage cells.

2. The memory module of claim 1, wherein ones of the multiple IC memory chips further comprise:
 mode register storage for storing configuration settings associated with the on-chip transfer of data.

3. The memory module of claim 2, wherein for ones of the multiple IC memory chips:
 the mode register storage includes fields to store configuration setting values for at least one from the group comprising transfer mode, start transfer, interrupt transfer, abort transfer, transfer size, and stride.

4. The memory module of claim 1, wherein for ones of the multiple IC memory chips:
 the first portion of the array of storage cells comprises a first bank; and
 the second portion of the array of storage cells comprises a second bank.

5. The memory module of claim 1, wherein for ones of the multiple IC memory chips:
 the transfer circuitry, in response to an abort command, terminates the on-chip transfer of data.

6. The memory module of claim 1, wherein for ones of the multiple IC memory chips, the transfer circuitry comprises:
 a write data path selectively interfaced between a set of data input/output (I/O) pins and the array of storage cells;
 a read data path selectively interfaced between the set of data input/output (I/O) pins and the array of storage cells; and
 a bypass data path selectively coupled between the write data path and the read data path, the bypass data path enabled in response to the internal transfer command, and operative to route the read data on-chip from the read data path to the write data path.

7. The memory module of claim 1, wherein ones of the multiple IC memory chips further comprise:
 state register storage; and
 wherein the transfer circuitry, in response to the interrupt command, is to load information indicating a most recent state of the on-chip transfer of data, as stored information, to the state register storage.

8. The memory module of claim 7, wherein for ones of the multiple IC memory chips:
 the transfer circuitry, in response to a restore command, is to read the stored information from the state register storage and resume the on-chip transfer of data.

9. A method of operation in a memory module including multiple integrated circuit (IC) memory devices, for ones of the multiple IC memory devices the method comprising:
 in an internal transfer mode of operation,
  transferring, in response to a transfer command, data on-chip from a first group of storage cells to a second group of storage cells, the transferring comprising reading stored data from the first group of storage cells,
  transmitting the data as on-chip transfer data, and writing the on-chip transfer data to the second group of storage cells;
 receiving an interrupt command; and pausing the transferring in response to receiving the interrupt command, and carrying out an unrelated memory access operation involving at least the first group of the storage cells or the second group of the storage cells.

10. The method of claim 9, wherein for ones of the multiple IC memory devices, the method further comprising:
storing configuration settings associated with the transferring in a mode register.

11. The method of claim 9, wherein for ones of the multiple IC memory devices, the method further comprising:
receiving a restore command; and
resuming the transferring in response to the restore command.

12. The method of claim 11, wherein for ones of the multiple IC memory devices, the method further comprising:
in response to the interrupt command, loading information indicating a most recent state of the transferring to state register storage; and
reading the state register storage in response to the resume command to resume the transferring.

13. The method of claim 9, wherein for ones of the multiple IC memory devices, the method further comprising:
receiving an abort command; and
terminating the transferring in response to the abort command.

14. The method of claim 9, wherein for ones of the multiple IC memory devices, the method further comprising:
during a normal mode of operation,
interfacing a write data path between a set of data input/output (I/O) pins and the first group of storage cells for write operations involving the first group of storage cells;
interfacing a read data path between the set of data input/output (I/O) pins and the first group of storage cells for read operations involving the first group of storage cells; and
during the internal transfer mode of operation,
bypassing the set of data I/O pins to route the read data from the first group of storage cells along the read data path to the write data path for writing to the second group of storage cells.

15. A dynamic random access memory (DRAM) module, comprising:
multiple DRAM memory devices for coupling to a data bus path, ones of the multiple DRAM memory devices including
a first group of storage cells and a second group of storage cells;
transfer circuitry responsive to a transfer command, to perform an on-chip transfer of data from the first group of storage cells to the second group of storage cells; and
wherein the transfer circuitry, in response to an interrupt command, is to pause the on-chip transfer of data involving the first group of storage cells and the second group of storage cells, and to carry out an unrelated memory access operation involving at least the first group of storage cells or the second group of storage cells.

16. The DRAM module of claim 15, wherein ones of the multiple DRAM memory devices further comprise:
mode register storage for storing configuration settings associated with the on-chip transfer of data.

17. The DRAM module of claim 15, wherein ones of the multiple DRAM memory devices further comprise:
state register storage; and
wherein the transfer circuitry, in response to the interrupt command, is to load information indicating a most recent state of the on-chip transfer of data as stored information to the state register storage.

18. The DRAM module of claim 17, wherein for ones of the multiple DRAM memory devices:
the transfer circuitry, in response to a restore command, is to read the stored information from the state register storage and resume the on-chip transfer of data.

19. The DRAM module of claim 15, wherein for ones of the multiple DRAM memory devices:
the transfer circuitry, in response to an abort command, terminates the on-chip transfer of data.

20. The DRAM module of claim 15, wherein:
the multiple DRAM memory devices are organized into multiple ranks; and
wherein ones of the multiple ranks share a common data bus path and are responsive to a dedicated chip select signal.

* * * * *